US008738502B2

(12) United States Patent
Domowitz et al.

(10) Patent No.: US 8,738,502 B2
(45) Date of Patent: May 27, 2014

(54) ELECTRONIC TRADING SYSTEM AND METHOD THAT PROVIDE REAL-TIME TRADE ANALYTICS

(75) Inventors: Ian Domowitz, New York, NY (US); Sabitha Arputham, Culver City, CA (US); Brian Kiernan, New York, NY (US); Kevin O'Connor, Culver City, CA (US)

(73) Assignee: ITG Software Solutions, Inc., Culver City, CA (US)

( * ) Notice: Subject to any disclaimer, the term of this patent is extended or adjusted under 35 U.S.C. 154(b) by 41 days.

(21) Appl. No.: 13/283,046

(22) Filed: Oct. 27, 2011

(65) Prior Publication Data

US 2013/0110695 A1    May 2, 2013

(51) Int. Cl.
*G06Q 40/04* (2012.01)

(52) U.S. Cl.
USPC .......................................... 705/37; 705/36 R

(58) Field of Classification Search
None
See application file for complete search history.

(56) References Cited

U.S. PATENT DOCUMENTS

| | | | |
|---|---|---|---|
| 7,028,006 B1 * | 4/2006 | Marsden et al. | 705/36 R |
| 7,401,048 B2 * | 7/2008 | Rosedale et al. | 705/37 |
| 8,352,354 B2 * | 1/2013 | Sylvester | 705/37 |
| 2002/0091606 A1 * | 7/2002 | Shapiro | 705/36 |
| 2005/0102220 A1 * | 5/2005 | Stackpole | 705/37 |
| 2006/0259394 A1 * | 11/2006 | Cushing et al. | 705/37 |
| 2008/0077538 A1 * | 3/2008 | Schebece | 705/36 R |
| 2011/0047068 A1 * | 2/2011 | Merrin et al. | 705/37 |
| 2013/0030982 A1 * | 1/2013 | Sofianos | 705/37 |

FOREIGN PATENT DOCUMENTS

WO    WO 99/56192    * 11/1999

OTHER PUBLICATIONS

Market Incompleteness and Divergences Between Forward and Futures Interest Rates. Edward J. Kane. The Journal of Finance, vol. 35, No. 2, Papers and Proceedings. Thirty-Eighth Annual Meeting American Finance Association, Atlanta, Georgia, Dec. 28-30, 1979 (May 1980), pp. 221-234.*

* cited by examiner

*Primary Examiner* — Robert Niquette
(74) *Attorney, Agent, or Firm* — Rothwell, Figg, Ernst & Manbeck, P.C.

(57) ABSTRACT

The present invention relates generally to electronic trading systems. More particularly, the present invention relates to systems and methods for providing, within an electronic trading process, real-time or near real-time pre- and post-trade analytics to assist traders make the decision of how to trade electronically a particular tradeable asset. Pre- and post-trade analytics can be displayed to a trader without affecting their workflow. Moreover, pre- and post-trade analytics can be used to make trading recommendations, to select or modify a trading strategy, to select and or modify trading destinations, brokers, algorithms or venues, and/or to automatically generate and transmit electronic trade orders or to effect trades.

16 Claims, 4 Drawing Sheets

ELECTRONIC TRADING SYSTEM AND METHOD THAT PROVIDE REAL-TIME TRADE ANALYTICS

BACKGROUND OF THE INVENTION

1. Field of the Invention

The present invention relates generally to electronic trading systems. More particularly, the present invention relates to systems and methods for providing, within an electronic trading process, real-time pre- and post-trade analytics that assist traders make the decision of how to trade a particular tradeable asset.

2. Description of the Related Art

Trading systems exist that allow institutional traders to create and maintain trade orders. For example, Order Management Systems (OMS) are known, which perform a number of features including the creation and maintenance data relating to trade orders, compliance, and other investment bookkeeping functions. For example, The MacGregor Group, Inc. offers an OMS called MACGREGOR XIP®. Execution Management Systems (EMS) are also known. EMS's are another kind of trade tool that include facilities for creating electronic trade orders and execution features that allow traders to transmit electronic trade orders to a plurality of destinations electronically. An example of an EMS is ITG's Triton® EMS.

Trade orders are often transmitted to sell-side entities (e.g., broker dealers) for execution directly or via electronic trade routing networks. That is, a buy-side institutional trader, or other investor, may manually select a destination/broker for an electronic trade order in his or her OMS or EMS, which will then be transmitted to the designated broker destination via the network. Once a broker receives an order, they will typically use any and all means available to execute the trade order while maximizing gain to the broker.

Traders may also use algorithmic trading systems that utilize models and strategies to provide traders the best possible execution price while trying to reduce market impact. Institutional traders, i.e., buy-side traders who execute large volume orders, often employ algorithmic trading systems as an order destination to slice and dice large block orders into smaller, more easily executed orders that may be transacted at final trade destinations, such as an exchange, broker, electronic communication or crossing network (ECN) or alternative trading system (ATS), throughout a trading day or even over a longer period.

Buy-side institutional traders are faced with a number of challenges, including extreme volatility, counterparty risk, and rapidly evolving regulatory and economic environments. Furthermore, fragmentation of the market structure has made it increasingly difficult for the institutional trader to quickly access clean block liquidity while avoiding market impact.

It is often a difficult process to select a destination for an electronic trade order. This decision may involve consideration of a number of factors. One such factor, for example, is the historical performance of the destination/broker for the particular trade that is proposed. While analysts may provide reports on broker performance, no current trading system exists that provides real-time or near real-time pre-trade and post-trade analytics to a trader in the course of their trading process that provides decision support or automates decisions.

SUMMARY OF THE INVENTION

The present invention includes novel systems and methods for providing real-time, or near real-time pre- and/or post-trade analytics to a trader. Given a proposed electronic trade order, the analytics may include a display illustrating how others have done for this type of particular order based on historical performance data. An order may be analyzed using three types of characteristics (in "three-dimensions"): order characteristics, asset characteristics and market characteristics.

The invention is particularly applicable to front end trader tools, such as an order management system or execution management system. Pre- and post-trade analytics can be displayed to a trader without affecting their workflow. Moreover, pre- and post-trade analytics can be used to generate electronic trading recommendations, to select or modify an electronic trading strategy, to select and or modify electronic trading destinations, brokers, algorithms or venues, and/or to automatically generate and transmit electronic trade orders.

According to an embodiment of the present invention, a system and method of electronic trading are provided that merge pre- and post-trade analytics to help traders make a real-time or near real-time decision of how to trade one or more assets under management, such as a security in a portfolio, using a trader front end tool, such as an OMS or EMS. Trade characteristics of the asset to be traded, such as order size, security market cap, and current volume and volatility conditions of the asset, can be used to classify an order. Then the trading performance results of all similar orders based on these criteria over a predetermined historical time period (e.g. six months) can be determined, aggregated by destination/broker, and ranked by destination/broker. This information describes or illustrates order difficulty and can be used to automatically or manually choose a trading destination based on each destination's past performance of similar trades.

According to an embodiment of the present invention, a computerized method is provided for providing decision support or automation for electronically trading a tradeable asset, such as a security instrument. The method includes providing, at an OMS or EMS, analytical data during the trading process that can be used to select a trade order destination. Trade characteristics of a security to be traded (which may be input into the OMS or EMS), including order size, security market cap, and current volume and volatility conditions of the security can be used to classify an electronic trade order. Based on historical trading data, trading performance results of all similar orders based on these criteria over a predetermined historical time period (e.g. six months) can be returned, aggregated by destination, and ranked by destination. The information is preferably displayed on the OMS or EMS trade blotter or in a pop-up window. The trader can then use this information to understand order difficulty and possibly choose a trading destination based on each destination's past performance of similar trades.

According to another embodiment of the present invention, trade processes, such as generation, modification and cancellation of electronic trade orders, can be automated based upon the information.

According to another embodiment of the present invention, recommendations can be generated based upon based upon the information.

According to an embodiment of the present invention, a delivery and graphical display mechanism, or "widget" may be provided for a trader front end tool, such as an OMS or EMS. The widget can be configured to display analytics in a pop-up and include features that provide trading functions. The widget can be configured to be initiated through the OMS or EMS and to communicate therewith. The widget may be coupled with historical trading data platforms, such as ITG's Peer Group Database and configured to perform classification, display and trading functions according to one or more embodiments of the present invention.

According to embodiments of the present invention, the systems and methods described herein can be applied to liquidity pools, trading venues, etc. containing indications of interest, or also nonbinding orders.

According to embodiments of the present invention, the systems and methods described herein can be applied to algorithmic trading systems.

According to an embodiment of the present invention, the display analytics include a listing of brokers or destinations along with a graphical representation of the certainty or probability that the live order will be appropriately executed by the broker or destination.

Further features and advantages of the present invention shall be understood in view of the following description with reference to the drawing figures.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF THE PREFERRED EMBODIMENTS

For purposes of this application, certain terms are defined as follows:

Order means an indication to buy or trade a tradeable asset. An order may be automatic or may require conditions to be met before execution is possible. Orders are meant to include limit orders, market orders, immediate or cancel orders, hidden orders, indications of interest, and other orders or indications.

Original order and block order are used to describe the order for a large number of shares placed of a particular security at a trading system by a buy side institutional trader.

Suborder is used to describe a portion of an original order for a security for less than the original number of shares.

ATS is used to refer to an Alternative Trading System, which is defined as a trading system that is not regulated as an exchange, but is a venue for matching the buy and sell orders of its subscribers and is subject to Regulation ATS. The number of available ATSs has grown rapidly with more than 40 currently being offered by various entities.

ECN is used to refer to an Electronic Communications Network. The Securities and Exchange Commission defines ECNs as electronic trading systems that automatically match buy and sell orders at specified prices. ECNs must register with the SEC as broker-dealers and are subject to Regulation ATS.

Alternative Trading Systems (ATSs) are crossing systems in which bids and asks are not displayed on any market or exchange, thus reducing the likelihood that information leakage about a large order could lead to unfavorable price movement. These ATSs can be independent or operated by a variety of different types of entities including broker/dealers, consortiums, and exchanges. ATSs and other "dark pools" may have attributes, such as average trade size, which would result in a trader favoring the use of one "dark pool" over another under particular circumstances.

"Dark pools" typically are ATSs; however, the skilled person will understand that dark liquidity (non-displayed or "hidden") can be found in other trade destinations such as ECNs and Exchanges (e.g., hidden orders).

Trading destination refers to the electronic destination of an order sent by a trader and can include, but is not limited to, brokers, exchanges 124, ATSs 114, 116, 118, 120, ECNs 122, and algorithms. The actual execution destination, i.e., where trades are executed, may be different. For example, an order can be sent to an algorithm which itself may send sub-orders to a number of ATSs for execution.

Figure 1:
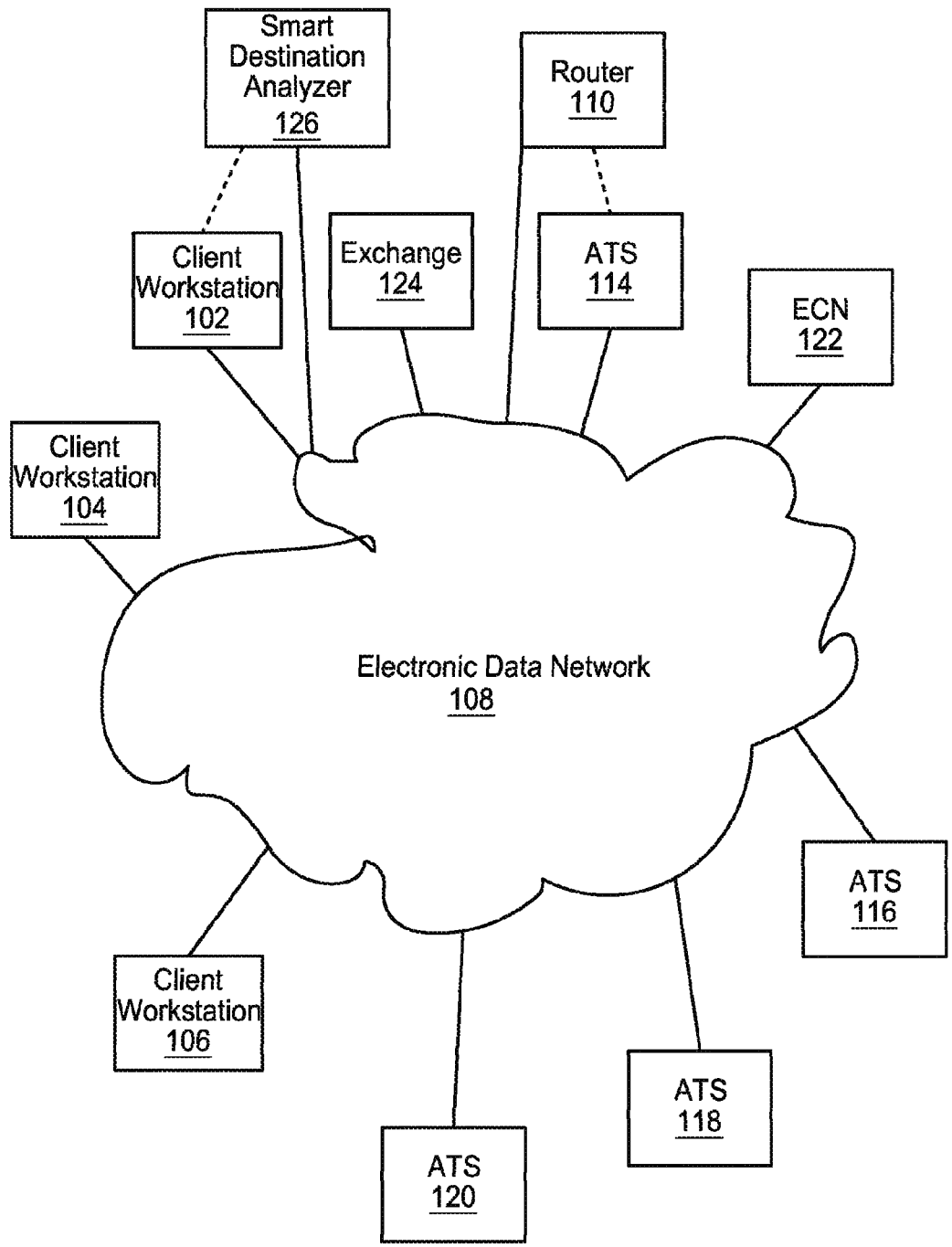
FIG. 1 is a block diagram illustrating representative trading systems according to an embodiment of the invention.

FIG. 1 is a block diagram that illustrates an exemplary representative trading system according to an embodiment of the present invention. The system shown in FIG. 1 is provided solely for the sake of illustration and is not intended to limit the scope of the invention.

A trading system can include client computer workstations 102, 104, 106 that may be connected to an electronic data network 108 and can be used by traders. Client computer workstations 102, 104, 106 may be configured to execute one or more trading applications for trading securities, such as an OMS, EMS or a specialized trade client or interface for directly accessing a trade routing system 110, which is configured to provide direct market access, algorithmic trading access, etc. Exemplary trading client applications may include ITG's TRITON®, RADICAL®, ITG CHANNEL®, and MACGREGOR XIP®.

The electronic data network 108 can include a local area network (LAN), wide area network (WAN), packet-switched network, messaging buses, the Internet, etc.

A Smart Destination Analyzer 126 is coupled with the electronic data network 108 and can be configured to receive and transmit order data from and to other trading systems, and to provide pre-trade, real-time (or near real-time) and post-trade analytics and other trade functions according to aspects of the present invention described in further detail below. According to aspects of the present invention, the Smart Destination Analyzer can be configured to receive order data from a computerized trading platform relating to a proposed electronic trade order, and to classify the proposed electronic trade order based on one or more characteristics of the order. Preferably, the classification is based on at least one characteristic from three different types of characteristics, including characteristics for the order itself (e.g., order size, order parameters, limits, and urgency), for the underlying asset (e.g., market capitalization, current volume and volatility), and for the current market conditions (e.g., market volatility, current political and financial events, etc.). The Smart Destination Analyzer can be further configured to calculate, in real-time or near real-time, trading performance results of similar historical orders placed with a number of trading destinations using historical data. The historical data is preferably stored in fast access storage. A graphical display of the potential trade destinations and related trading performance results for the similar historical orders can then be displayed or otherwise generated.

The Smart Destination Analyzer 126 can be provided in a variety of different ways including as a stand-alone local desktop application executing on a client computer workstation, a web-based application accessed through an internet browser, a widget, as a component of other front end trading applications, or a combination thereof.

The architecture used to provide network communications and to deliver services can take well known forms. In one embodiment, systems and methods may be included as disclosed in co-owned U.S. patent application Ser. No. 13/022,420, filed on Feb. 7, 2011, and entitled "Systems and Methods for Providing Access to Financial Trading Services," the entire contents of which are hereby incorporated by reference.

In one embodiment of the present invention, electronic trade orders to buy or sell securities can be placed at client computer workstations 102, 104, 106 and transmitted via the electronic data network 108 to the trade router 110 for routing to trade destinations according to known protocols.

Figure 2:
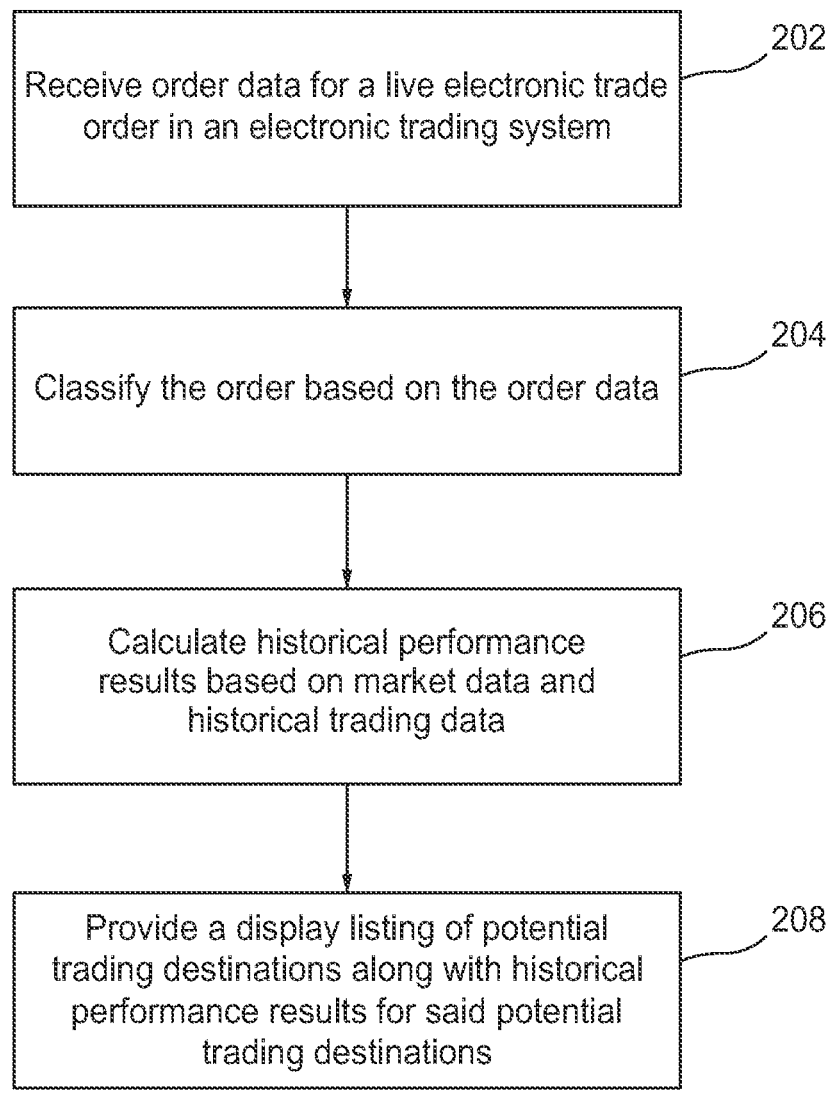
FIG. 2 is a flow diagram illustrating an exemplary trading process according to an embodiment of the present invention.

FIG. 2 is a simplified flow chart illustrating a method according to an embodiment of the present invention. The skilled person should understand that other steps can be added, modified, or removed based on the teachings of this disclosure.

At step 202, order data is received for electronic trade orders from a trading platform, such as an OMS or EMS. Further details regarding this step are explained below in connection with FIG. 4.

The received order is classified at step 204. For example, the order can be classified based on the trading criteria for the order, including order size, security market cap, and current volume and volatility conditions of the security, historical trading data for the security and the type of trade, and historical trading data for a plurality of trading destinations. Further details regarding this step are explained below in connection with FIG. 4.

At step 206, historical performance results are calculated in real-time or near real-time, based on market data and historical trading data. Further details regarding this step are explained below in connection with FIG. 4.

Figure 3:
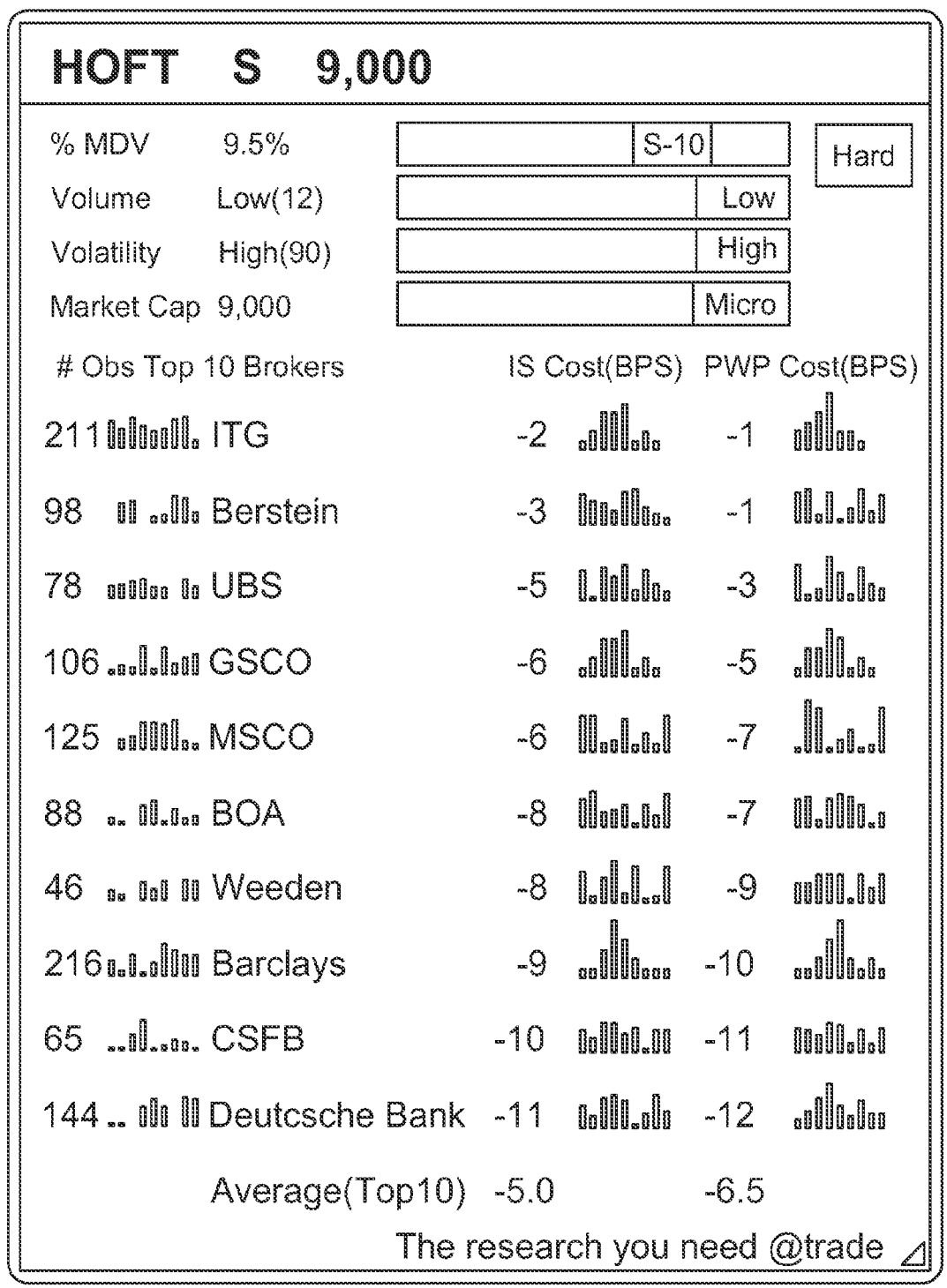
FIG. 3 is screen shot of a display screen according to an embodiment of the present invention.

At step 208, provide a display listing potential trading destinations along with historical performance results is provided for the potential trading destinations. An exemplary display is shown in FIG. 3 and described below. Further details regarding this step are explained below in connection with FIG. 4.

Optionally, an electronic trade order can be sent, automatically or manually, based on the analytics displayed. For example, functionality can be provided as described herein for selecting the destination in the ranking display and, based on the selection, generating and sending an electronic trading order to the destination. A screen shot of an exemplary display, which could be produced by a widget, is illustrated in FIG. 3. The display screen could be actuated any number of ways and can be provided by or in connection with a front end trading tool, such as ITG TRITON®. Actuation could be made through any number of user inputs, such as a right click on a proposed trade or button provided in the trade order blotter screen.

As shown, the display preferably includes features that display useful analytics to the trader about how best to make the particular trade proposed. Each order selected (e.g., sell 9000 shares of Hooker Furniture Corporation (Public, NASDAQ:HOFT)) has at least three types (dimensions) of characteristics that may be analyzed in order to provide historical performance data and actionable real-time insights to a trader. These include (a) characteristics of the order itself, including, for example, order size, order parameters, limits, and urgency; (b) characteristics of the asset being traded, including, for example, given a security, the characteristics might include market capitalization, current volume and volatility considerations of the company itself; and (c) characteristics relating to the current market environment, including, for example, market volatility at large, current political and financial events, etc. A search can be made in historical trading data for executed orders having the same or similar characteristics in each, all, or a combination of these dimensions.

The top part of the user interface shows the order characteristics with highlighted "buckets." The bottom part shows the details of past performance of similar trades, including ranks, number of executions, average costs, and distributions. Other data sets and trading venues (IOIs, Algorithms, etc.) can be added, and the type of results returned can be modified accordingly either by the service provider or by the user.

In one embodiment, users are provided with features that allow a trade to be sent directly from the interface 300. For example, if algorithm ranks are displayed, the trader can send his trade to the top performing algorithm (e.g. ITG VWAP) by simply clicking on it and without going back into the OMS blotter.

The display shown in FIG. 3 includes useful interfacing functions. For example, as shown in FIG. 3, the number of brokers to display can be selected by mouse-clicking on a bar 302. % MDV can be displayed. But, volume and volatility can be selected, and Market Cap can be displayed. In the bottom half of the screen, brokers or destination can be ranked for the trade by, for example, costs. In this example, two benchmarks are used for ranking: IS costs and PWP costs. Other benchmarks could be used, for example, see co-owned U.S. Pat. No. 7,539,636, entitled SYSTEM AND METHOD FOR ESTIMATING TRANSACTION COSTS RELATED TO A SECURITY, and co-owned U.S. patent application Ser. No. 12/691,451, filed on Jan. 21, 2010, entitled SYSTEM AND METHOD FOR EVALUATING SECURITY TRADING TRANSACTION COSTS, the entire contents of each of which are incorporated herein by reference. These patent documents describe "Peer Group Database," which can be used with the present invention to generate recommendations.

Numbers in far left column are the number of trades each broker made per trade type. The graphs are of distributions of costs, not of the success or failure of a particular trading strategy. (Note: the data behind this example screen is not actual data.)

A particular display and delivery mechanism for producing a display similar to the one shown in FIG. 3 is disclosed and described in co-owned U.S. Pat. No. 7,717,311, entitled SYSTEMS, METHODS, AND COMPUTER PROGRAM PRODUCTS FOR PROVIDING REAL TIME ANALYTIC WIDGETS IN A FINANCIAL TRADING SYSTEM, the entire contents of which are hereby incorporated by reference. The programming techniques described in U.S. Pat. No. 7,717,311 can be used to provide the display and delivery mechanism of the present invention, such as a widget or software interface.

Figure 4:
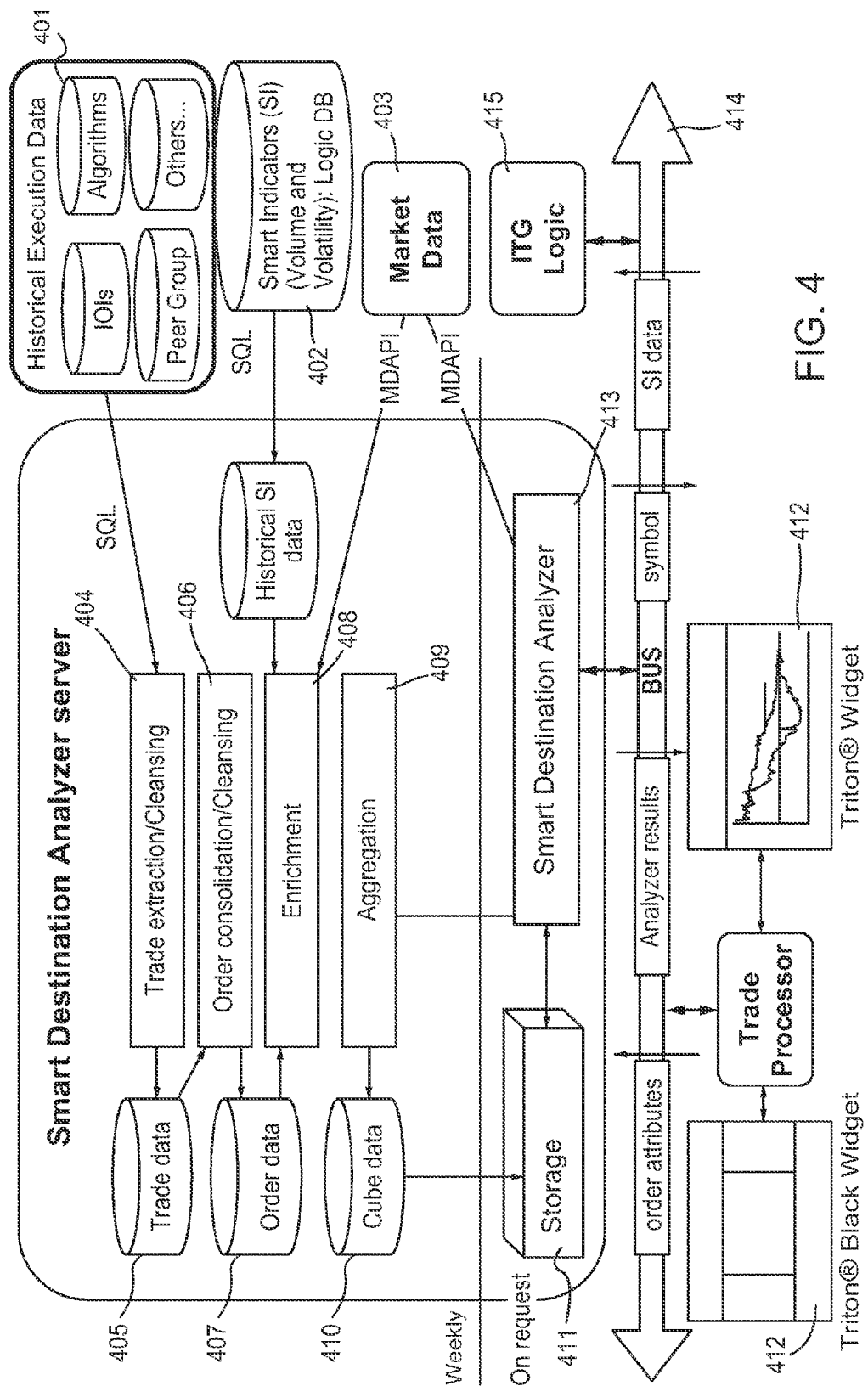
FIG. 4 is a hybrid architecture/flow diagram illustrating logical and physical data flow for systems and methods of according to an embodiment of the present invention.

Referring to FIG. 4, a hybrid architecture and data flow for the Smart Destination Analyzer according to an embodiment of the present invention is diagrammed. The following description is an example only, which mainly focuses on the use of performance-related historical trading data from a peer group database. However, the skilled person should understand that destinations, brokers, classification criteria, rank criteria, etc. can be modified and or replaced in accordance with the present invention.

Historical Execution Data source(s) 401 preferably include historical databases of trade execution details. Such details can include data items like an identification of the traded security, broker used, time of trade, size of trade, cost of trade vs. various benchmarks, type of trading technique used, etc. This historical trade information can be used to compare a live electronic trade order (i.e., an unexecuted electronic trade order on a trader's blotter) and its particular characteristics to similar trades in the past in order to recommend how to execute the order better. The data from historical databases is preferably enriched with other data, such as information about the volatility and volume environments at the times of the trades.

The Peer Group Database is an historical database of trades collected by ITG from ITG TCA® customers. This can be implemented as disclosed in U.S. Pat. No. 7,539,636 or patent application Ser. No. 12/691,451 already incorporated herein. The performance (in terms of cost) of each trade for each broker executing trades for ITG TCA clients is typically collected.

The IOIs database is a database containing historical details about indications of Interest (IOI) performance. This can include the brokers who offered IOIs and how well they performed, such as the quantity offered versus quantity actually executed by the broker. For example, ITG's POSIT ALERT® includes a non-negotiated IOI pool.

The Algorithms database is a database of data involving trades that went through a trade router, such as ITG's GATE, execution details of algorithmic trade orders, including performance by broker, and, perhaps most importantly, trading technique. Unlike Peer Group Database, which can only show performance by broker, while not considering what type of trading that each broker did for each trade (VWAP algorithm, dark pool, cash desk, etc.), this database can be used to breakdown trading performance by type of electronic trading technique.

The database labeled "others" is meant to include any other type of historical trading database that may be developed in the future.

A smart Indicators (SI) database 402 can be provided that can measure and report market conditions in terms of volatility, volume, and spread per security. Values can be reported as percentile scores, showing how current conditions compare to historical norms. Values from 0-20 are considered low, 21-79 as normal, and 80-100 as high. SI values are saved per security every day and this history is used to enrich the execution data by providing market condition context to each order.

Based on information from SI, order and security information can be used. In addition to SI information, an order can be classified based on its size, as a percent of median daily volume (% MDV), and the security market capitalization. Both of these metrics can be computed and retrieved by a Market Data system 403. These values are then used to enrich the execution data historically.

Further details regarding smart indicators are described in U.S. Pat. No. 7,680,718, entitled SYSTEM AND METHOD FOR GENERATING REAL-TIME SMART INDICATORS TO INDICATE ABNORMAL CONDITIONS IN A TRADING LIST OR PORTFOLIO, which issued on Mar. 16, 2010, the entire contents of which is incorporated herein by reference.

For Trade extraction/Cleansing (404), raw execution data can be extracted from its home database 401, cleaned by a trade execution/cleansing process 404, and stored in a separate trade database 405. By cleaning, it is meant that "bad" or "erroneous" records can be removed or corrected. Records can be removed for many reasons, including: duplicates, missing values, values that do not make sense such as negative price or end times recorded before start times, and outliers (reported costs are either much too high or low).

An order consolidation/cleansing process 406 can take the cleansed trade data and consolidate the orders. In terms of Peer Group Database data, for example, a buy side trader may send a large order (e.g., 1,000,000 shares) to a broker, which the broker trades in ten 100,000 share suborders. The Peer Group Database records each of these 100,000 share suborders separately and with separate transaction costs. Order consolidation is the process of consolidating these ten suborders into the one 1,000,000 share order and its associated costs, since this is the information that is important for evaluating the brokers. That is, a buy-side trader might not necessarily care about how a broker accomplishes their suborder, just how well the full order was completed. After consolidation, more cleansing similar to that reported above is performed, leading to Order data 407.

An enrichment system or process 408 can be provided to enrich the data. Using the SI and market data, security-specific volume Smart Indicator, volatility Smart Indicator, and market capitalization information in addition to order-specific % MDV, information is added to each order record to enrich the content. Each characteristic used to enrich can be broken up into groups to allow overall classifications of similar trades. For example:

Volume (3): Low, Normal, High

Volatility (3): Low, Normal, High

% MDV (6): 0-2%, 2-5%, 5-10%, 10-25%, 25-50%, >50%

Market Capitalization (4): Micro, Small, Mid, Large

The group values, and not the underlying number values, are what are used to enrich the Order data.

These historical enrichment characteristics are preferably the same characteristics that will be used in real time when classifying a trade so appropriate historical orders, namely those similar to the one to be traded, are compared. Other characteristics of either the order or security may be used to enrich the execution data as well.

An aggregation system or process 409 can group the enriched order data, which has one record per order, into groups based on the order/security characteristics as well as by broker/algo/IOI provider. Using the example groups listed above, there will be 216 (3×3×6×4) unique order types to which each order can be classified. This means, for example, that all Large Cap orders between 5-10% MDV during a Low volume and Low volatility environment will be classified together, while retaining a mapping to the destination/broker depending on the execution data source.

The two tables below show a simplified example of how Order data (Table 1) become aggregated into Cube data 410 (Table 3).

TABLE 1

Order Data

| Broker | Security | Size (shares) | Cost |
|---|---|---|---|
| ITG | MCD | 100000 | −5 |
| ITG | IBM | 15000 | −10 |
| ITG | CSCO | 80000 | −7 |
| MSCO | HLIT | 11000 | −8 |
| MSCO | ZQK | 9000 | −12 |
| CSFB | XOM | 8000 | −3 |
| CSFB | APPL | 9000 | −6 |

TABLE 2

Enriched Order Data

| Broker | Security | Size (shares) | Cost | Market Cap Group | % MDV Group | Volume Group | Volatility Group |
|---|---|---|---|---|---|---|---|
| ITG | MCD | 100000 | −5 | Large | 2-5% | High | High |
| ITG | IBM | 15000 | −10 | Large | 0-2% | Normal | Low |
| ITG | CSCO | 80000 | −7 | Large | 2-5% | High | High |
| MSCO | HLIT | 11000 | −8 | Small | 2-5% | Low | High |
| MSCO | ZQK | 9000 | −12 | Small | 2-5% | Low | High |
| CSFB | XOM | 8000 | −3 | Large | 0-2% | High | Normal |
| CSFB | APPL | 9000 | −6 | Large | 0-2% | High | Low |

TABLE 3

Cube Data

| Broker | Market Cap | % MDV Group | Average Cost | Volume Group | Volatility Group | Cost Distribution |
|---|---|---|---|---|---|---|
| ITG | Large | 2-5% | −6 | High | High | [−7 −5] |
| ITG | Large | 0-2% | −10 | Normal | Low | [−10] |
| MSCO | Small | 2-5% | −10 | Low | High | [−8 −12] |
| CSFB | Large | 0-2% | −3 | High | Normal | [−3] |
| CSFB | Large | 0-2% | −6 | High | Low | [−6] |

Once the data 410 is created, on a periodic or continuous basis, with the new data, it is placed into in-memory database, Storage Servers 411 can be provided to provide high-speed data access so that data can quickly be accessed from a user interface on request when analyzing a live trade to processed.

An EMS user, such as a Triton® user, is provided an interface that allows to click on an order in his blotter, or otherwise actuate, a Smart Destination Analyzer user interface 412. An exemplary interface is shown in FIG. 3.

Once the user requests to have Smart Destination Analyzer analyze the trade, the user interface is configured to send the order information to the Smart Destination Analyzer engine 413, via the Message bus 414 (described above). The Smart Destination Analyzer engine 413 can be configured to receive order information and make requests to the Market Data 403 service and Smart Indicator service 403 to return more characteristics of the order and security. A request to Market Data service 403 will return the market capitalization and the 21-Day-Median-Volume of the stock chosen. The size of the order in dollars is computed and compared to the 21-Day-Median-Volume to produce a % MDV size of the order. So two of the four criteria to classify the order, market cap and % MDV, have been computed.

Another request can be made to the Smart Indicator service 415 via Message to return the current volume and volatility characteristics of the chosen security as it compares to its historical norms. These values can both be in percentages as described above. So now the remaining two criteria have been returned.

The criteria values returned can be put into the predefined groups as described above. And with a group value for each criteria (e.g., Volume: Low, Volatility: High, % MDV Group: 5-10%, and Market Cap: Micro), the Smart Destination Analyzer engine requests and is returned the results of all trades contained in the historical Cube data 410 within storage servers 411 with the same group values.

The type of information that is chosen to be stored and displayed is flexible, but in each case furthers the goal of helping a trader trade by seeing how similar orders have performed in the past. According to an embodiment of the present invention, at least two display screens are provided to trader:

1. Group all Brokers into percentile ranges, such as top, middle, and bottom third. Then show the results, including average cost and distributions and number of executions, for these groups only (with or without naming the brokers in the group). This would allow a trader so see the general difficulty of a trade (similar to ITG Logic), but not receive a ranked broker list.

2. Allow traders to view broker ranks based only on their own trades. A ranked list of the top 10 brokers based on average cost for similar orders will appear, including number of executions per broker.

The order characteristics used to classify an order above should be data driven. Traders can offer their own insights to see how trades performed under situations defined by the trader. To do this is simple. For example, functionality can be provided to allow a simple click on the bucket(s) to override with their own insights.

For example, if the Smart Indicators indicates that HOFT is currently in a Low volume environment, but the trader believes that volume will increase based on some news, the trader can be allowed to click on the High volume bucket and Smart Destination Analyzer will be configured to return results for all trades with the new combination of the four characteristics, including High volume instead of Low.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

We claim:

1. A system for providing near real-time analytics to an electronic trading platform configured to store electronic trading orders and to send and receive electronic order data, said system comprising:

a messaging bus configured to receive and publish messages from and to computer systems coupled thereto;

a historical trading database coupled with said messaging bus;

a destination analyzer coupled with said messaging bus and configured to:

receive a message including order data over said bus from the electronic trading platform for a proposed electronic trade order, classify the electronic trade order based on trading criteria in said message, the trading criteria including order size, security market cap, current volume and volatility conditions of a security of the order, and volatility of a market in which the security is traded, search the historical trading database for executed orders having same or similar trading criteria as the received electronic trade order;

determine trading performance results of the same or similar orders based on said trading criteria over a predetermined historical time period, aggregated by destination or broker, and ranked by destination or broker, and transmit a message comprising the results of said determination; and a display and delivery mechanism in electronic communication with said electronic trading platform and coupled with said message bus, configured to:

receive order data from said electronic trading platform for a proposed electronic trade order, send a message to said message bus requesting analysis of said order, receive a message from said bus comprising results of said requested analysis performed by said destination analyzer, and display a graphical ranking of potential trade destinations within or along side an interface of said electronic trading platform based on the results in said received message.

2. The system of claim 1, wherein said graphical ranking includes distributions of costs for some subset of trades per destination per combination of trade characteristics next to average costs.

3. The system of claim 1, wherein said delivery and display mechanism is further configured to receive a selection from a user of one or more of said potential trading destinations and to send a message to said message bus that will cause an electronic trade order to be generated based on said proposed order and said selection to be sent to said trading destination.

4. The system of claim 1, wherein said historical trading data include data from a peer group database.

5. The system of claim 1, wherein the display generation is performed via a widget.

6. The system of claim 1, wherein the electronic trading platform is received from one of an OMS or an EMS.

7. The system of claim 1, wherein the destination analyzer is configured to classify the electronic trade order further based on historical trading data for the security and the type of trade.

8. The system of claim 1, wherein the display and delivery mechanism is configured to display the graphical ranking as a plurality of groups that each include a plurality of brokers without displaying any individual broker in the plurality of groups.

9. A system for providing near real-time analytics to an electronic trading platform configured to store electronic trading orders and to send and receive electronic order data coupled with a messaging bus, said system comprising:

a display and delivery mechanism in electronic communication with said electronic trading platform, configured to receive order data from said electronic trading platform for a proposed electronic trade order and to display a graphical ranking of potential trade destinations within or along side an interface of said electronic trading platform;

wherein said ranking is the result of classifying the electronic trade order based on trading criteria, the trading criteria including order size, security market cap, current volume and volatility conditions of a security of the order, and volatility of a market in which the security is traded, and of determining, from a historical trading database, trading performance results of executed orders having the same or similar trading criteria over a predetermined historical time period, aggregated by destination, and ranked by destination or broker.

10. The system of claim 9, wherein said graphical display includes distributions of costs for some subset of trades per destination per combination of trade characteristics next to average costs.

11. The system of claim 9, wherein said delivery and display mechanism is further configured to receive a selection from a user of one or more of said potential trading destinations and to cause an electronic trade order to be generated based on said proposed order and said selection to be sent to said trading destination.

12. The system of claim 9, wherein said historical trading data include data from a peer group database.

13. The system of claim 9, wherein the display generation is performed via a widget.

14. The system of claim 9, wherein the electronic trading platform is received from one of an OMS or an EMS.

15. The system of claim 9 wherein the classification of the electronic trade order is further based on historical trading data for the security and the type of trade.

16. The system of claim 9, wherein the display and delivery mechanism is configured to display the graphical ranking as a plurality of groups that each include a plurality of brokers without displaying any individual broker in the plurality of groups.

* * * * *